United States Patent [19]

Ymker et al.

[11] 4,367,654
[45] Jan. 11, 1983

[54] DEVICE FOR MEASURING THE FLOW VELOCITY OF FLUIDS

[75] Inventors: Lucas Ymker, Culemborg; Christiaan J. Hoogendijk, H'veld-G'dam, both of Netherlands

[73] Assignee: Altometer, Productiebedrijf Van Rheometron A.G., Sliedrecht, Netherlands

[21] Appl. No.: 205,998
[22] PCT Filed: Oct. 25, 1979
[86] PCT No.: PCT/NL79/00005
§ 371 Date: Jun. 25, 1980
§ 102(e) Date: Jun. 25, 1980
[87] PCT Pub. No.: WO80/00876
PCT Pub. Date: May 1, 1980

[30] Foreign Application Priority Data
Oct. 25, 1978 [NL] Netherlands ............... 7810630

[51] Int. Cl.³ .................................... G01F 1/66
[52] U.S. Cl. ......................................... 73/861.29
[58] Field of Search ........... 73/861.29, 861.28, 861.27, 73/632, 597

[56] References Cited
U.S. PATENT DOCUMENTS
3,623,363  11/1971  Dory .......................... 73/861.29

Primary Examiner—Stephen A. Kreitman
Attorney, Agent, or Firm—Stevens, Davis, Miller & Mosher

[57] ABSTRACT

A device for measuring the flow velocity of fluids including at least one pair of electro-acoustic transducers at the ends of a measurement path, said pair of transducers simultaneously transmitting acoustic pulses and receiving the same at first and second times, a transmission circuit, a receiving circuit, an integration circuit having an integration capacitor, the charge and discharge circuits of which are controlled by the transit times of the acoustic pulses, the starting point of which is sharply defined by a control circuit of both transducers.

11 Claims, 12 Drawing Figures

DEVICE FOR MEASURING THE FLOW VELOCITY OF FLUIDS

The invention relates to a device for measuring the flow velocity of fluids including at least one pair of electro-acoustic transducers to be positioned at the ends of a measurement path, each pair of said transducers simultaneously transmitting acoustic pulses and receiving the same at first and second times dependent on the velocity of the fluid, a clock pulse generator, a transmission circuit, a receiving circuit including an amplifier and a detection circuit for each of the transducers separately, an integration circuit including an integration capacitor for use in processing the difference in propagation time of the acoustic pulses, wherein the transmission and reception times for each of the transducers are determined. A device of this type is known from German Pat. No. 2,854,321.

In fluid flow technology several applications of devices for measuring the flow velocity of a liquid or gas in pipes, ducts and the like are generally known, all utilizing the physical property that pressure or sound waves propagate in a fluid at a velocity which applies to said fluid. Hence the effective propagation velocity with respect to a stationary reference position is the resultant of the flow velocity of the fluid with respect to said reference position plus the propagation velocity of the sound in said fluid.

When presuming for instance a measurement path AB within a fluid having a length L the resultant velocity in the direction from A to B is: $L/t_{AB} = C + V\cos\phi$ and the resultant velocity in the direction from B to A is: $L/t_{BA} = C - V\cos\phi$, in which V is the flow velocity of the fluid and $\phi$ is the angle between the flow direction of the fluid and the measurement path AB. Where the sound velocity C is not constant, said velocity being dependent on, among other things the temperature and the salt concentration and the value of said velocity is not always known either it is preferred to use the equation $$V\cos\phi = \frac{L}{2} \cdot \frac{t_{AB} - t_{BA}}{t_{AB} \times t_{BA}}$$

In accordance with the known technics both electro-acoustic transducers provided at opposite ends of the measurement path simultaneously emit short acoustic pulses. In this way one avoids moreover disturbing effects of interferences through reflections and other paths than the measurement path as occur when using continuous sound tones.

Where both the transducers provided at opposite ends of the measurement path function as a transmitter and also as a receiver the same value of L applies to both sound transmissing directions. This equality is an important advantage when measuring flow velocities V of a small value with respect to the sound velocity C. When very accurately determining the transmission times as well as the reception times the propagation times as well as the difference in propagation time of both transits may be determined wherein the sound velocity C is included in the calculation.

An object of the invention is now to provide a device having a very simple construction for determining the above function and by means of which at low flow velocities of the fluid a high accuracy of the measurement and a very good zero stability are obtained.

In a device of the type mentioned above the object is attained in accordance with the invention in that the integration capacitor is connected to a potential divider connected to a gate circuit and having in each leg thereof a switching means conductive in the rest condition after the transmission time, two different potentials being supplied in the rest condition to the one leg and to the other leg of said divider whereby the capacitor adjusts itself to the middle of the potential difference, while controlled by the gate circuit the switching means associated with the one transducer is blocked after the first reception time and subsequently the switching means associated with the other transducer is blocked after the second reception time.

The invention will now be described on the basis of an embodiment thereof having reference to the drawings in which.

Figure 7A:
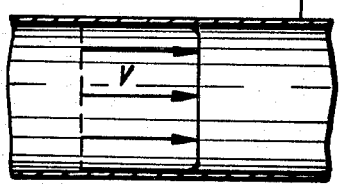
Figure 7B:
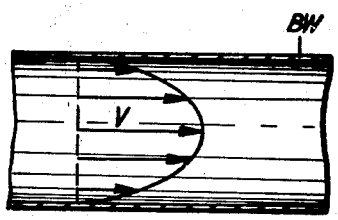
Figure 7C:
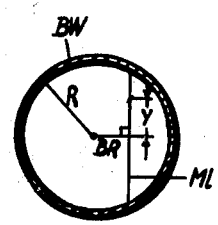

FIGS. 7a and 7b exemplify possible flow velocity distributions of the fluid within a pipe; and FIG. 7c represents a cross section of a pipe in which it has been indicated that the measurement path is located at a certain distance from the axis of the pipe.

Figure 1:
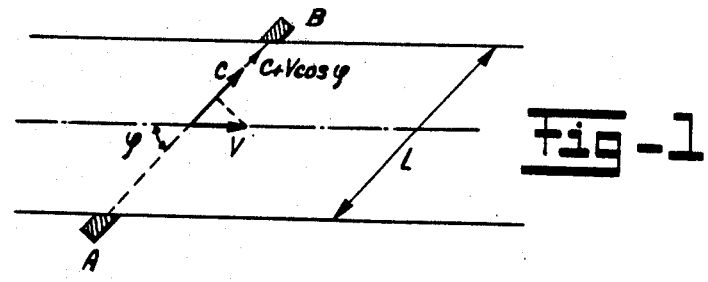
FIG. 1 shows an example of a measurement path provided within a flowing fluid.

In FIG. 1 there has been shown an example of the general location of a measurement path AB that has been arranged within a fluid flowing at a velocity V and making an angle $\phi$ with respect to the direction of the flow. At both the opposite ends there has been provided an electro-acoustic transducer. For the velocity component the above derived equation applies.

As has already been indicated above it is very important that the exact time of transmission of the acoustic pulses as well as of the receipt of the received signal in both receiving circuits be determined as accurately as possible. When transmitting by means of electro-acoustic transducers it is first of all important to have a transmission power as high as possible as well as a transmission time and a transmission signal for both the transducers or crystals that are as accurate and identical as possible.

Figure 2A:
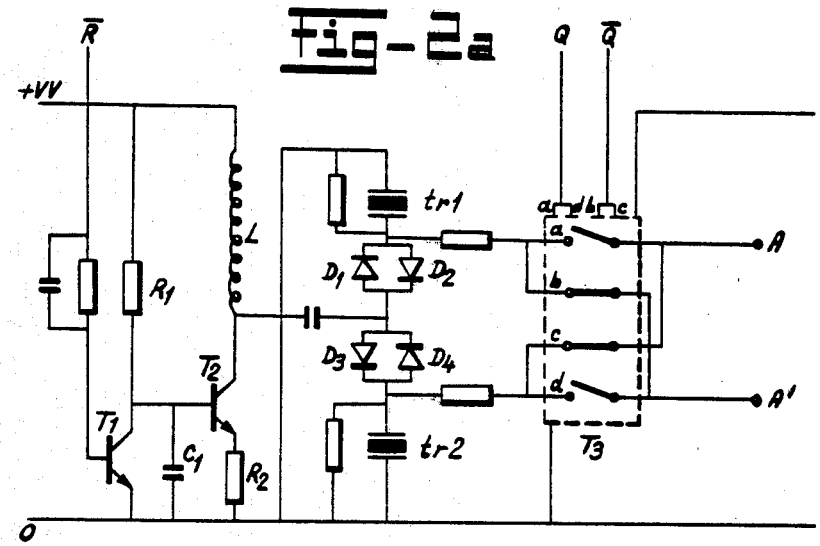
FIGS. 2a and 2b represent a diagram of the transmission circuit associated with the two transducers as well as of a receiving circuit including an amplifier and a detection circuit associated with the one or the other of said transducers, respectively.
Figure 2B:
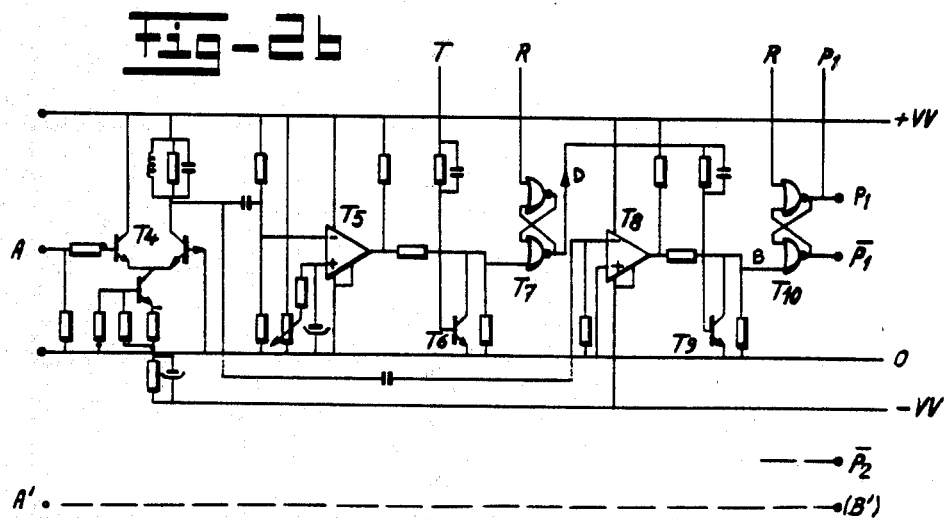

With reference to FIG. 2 there will be described a transmission circuit associated with both the electro-acoustic transducers as well as a receiving circuit including an amplifier and detection circuit assoicated with one of said transducers. A coil is included in the load circuit of an end transistor T2. The base of the end transistor T2 is connected to a control transistor T1 through a RC network (C1, R1). For obtaining a high transmission power, i.e. a high transmission potential, a sharply changing current should run through the coil L during a short time.

The current control through the coil L occurs by means of the end transistor T2, the base of which is connected to the said RC network. By supplying a clock or reset pulse from the clock pulse generator (FIG. 5) to the control transistor T1 this transistor T1 is cut off whereby the potential at the base of the transistor T2 increases exponentially and the current in the load circuit of the same transistor T2 increases slowly, while the control transistor T1 is cut off. The thus caused current running through the coil L is determined by the elements R1, C1, R2 and the width of the reset pulse. The gradual exponential increase of the current through the coil L in accordance with the time constant of the RC-network serves to avoid generator of any small pulses before the said transmission time which might cause disturbances. The current through the coils is not limited to a maximum value but dependent on the maximum power dissipation of the end transistor T2.

When the clock potential becomes positive the control transistor T1 is rendered conductive whereby the base of the end transistor T2 is connected to ground. Consequently, the current in transistor T2 and hence also through the coil L is abruptly cut off. As a consequence thereof there is generated a high induction potential across the coil this potential being supplied to the transducer tr1 and tr2 through a condenser and antiparallelly arranged diodes. The transducer or the crystal tr1, tr2 will then oscillate in its own resonance frequency and hence emit a transmission pulse in the fluid. By means of this control method the crystals during the transmission, are supplied with an identical signal. During the reception the crystals are separated from each other by means of the two pairs of antiparallelly arranged diodes. Instead of these diodes there may also be used electronically controlled switches.

After the transmission by the first transducer tr1 and the second transducer tr2, respectively, the acoustic pulses are received by the second transducer tr2 and the first transducer tr1, respectively, after a certain transit time. From the transducers the received signals are supplied through a commutator T3 to a receiving circuit comprising an optionally selfcontrolling amplifier circuit T4 and a detection circuit T5, T6, T7, T8, T9, T10. The transducers tr1 and tr2, respectively, are connected alternately per repetition period to the one and to the other receiving circuit. For clearness sake there has been shown only one receiving circuit (T4, T5, T6, T7, T8, T9, T10) in FIG. 2b between lines A and B. The other receiving circuit is provided between the lines A' and B'.

After amplification by the amplifier circuit T4 the received signal is supplied to two differential amplifiers T5, T8 each one functioning as a potential comparator. To the plus-input of the differential amplifier T5 there is adjusted a level corresponding to a noise level by means of which the threshold for the lowest adjustable level is determined that has to be surpassed by the reception signal. Upon supplying the reception signal consisting of different successive waves to the minus-input a detection signal having a climbing front will be supplied at the output of the level detector when the said adjusted level is surpassed for the first time.

The detection circuit operates continuously and therefore also during the transmission. It being known approximately within which time interval after the transmission time the reception of a signal may be expected, the output signal of the level detector T5 will only be transmitted within said time interval indicated by a time window supplied by the clock pulse generator. To that effect there is inserted a switching transistor T6 between the output of the level detector T5 and ground, said switching transistor only being blocked during said time window (FIG. 6; signal T) supplied by the clock pulse generator so that the detection signal emanating from T5 may be transmitted to the gate circuit T7. The gate circuit T7 consisting of a gate combination of two Not-OR-gates operates as follows: by supplying the reset pulse R (FIG. 6) to the upper Not-OR-gate of the gate combination there is generated the leading edge associated to the transmission time of the switching signal D obtained at the output. The trailing edge of the signal is determined by the detection signal of T5.

Such a gate circuit has the important advantage that upon the detection after the reset pulse i.e. after the transmission there may only be given one change from zero to pulse or the reverse thereof. Consequently the advantage of this gate circuit is that positively and negatively going edges may be obtained simultaneously without any switching of a separate gate being required for obtaining the second edge when starting from a certain first edge. If for instance from a positive edge a negative edge would have to be derived then an extra gate should be incorporated in one of the lines that is to say a time delay of 20 nanoseconds.

The plus-input of the second differential amplifier T8 is grounded. The output of this zero point detector T8 is supplied across a resistor to a gate circuit T10 that is identical with T7. By means of T9 under the control of T7 the output of T8 is grounded. Upon receipt of a signal T9 will be blocked so that T8 may transmit its signal to T10. The edge of the control signal from T10 now corresponds in time to the first zero crossing of the received signal occuring after the first surpassment of the level adjusted by means of T5. In this way the time position of the trailing edges of the control signals P1 and P2 (from T10 and T10') are independent from the amplitude of the received signal.

In this way detection signals indicating the first and the second reception time are alternately per repetition period derived from the lines B and B'.

Figure 3A:
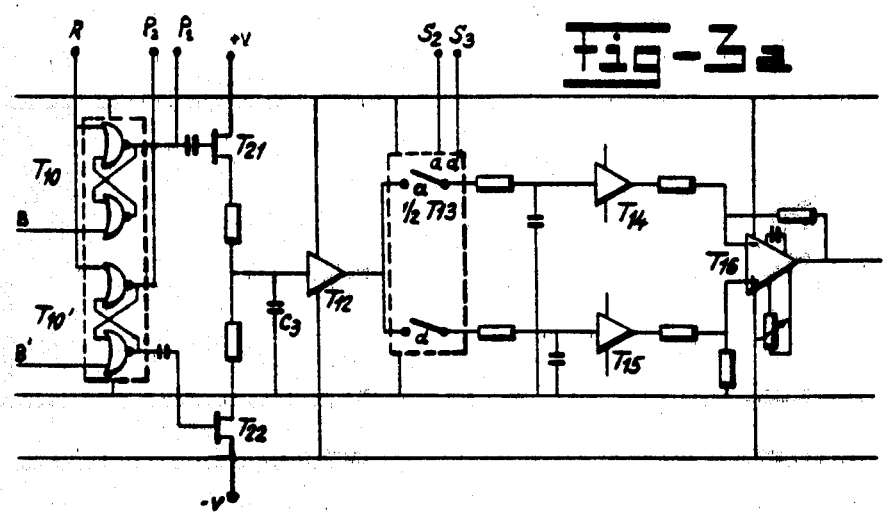
FIG. 3a represents a diagram of the gate circuit connected to both receiving circuits and the subsequent integration circuit for the difference in transit time including sampling and hold circuits.

In FIG. 3a there is represented a transit time difference integration circuit by means of which the difference in propagation times $\Delta t$ between the two propagation times is converted into a potential difference $\Delta V$, which conversion will have to be as accurately as possible in order to render for instance the measurement of a difference of 0.1 nanosecond well feasible.

Figure 3B:
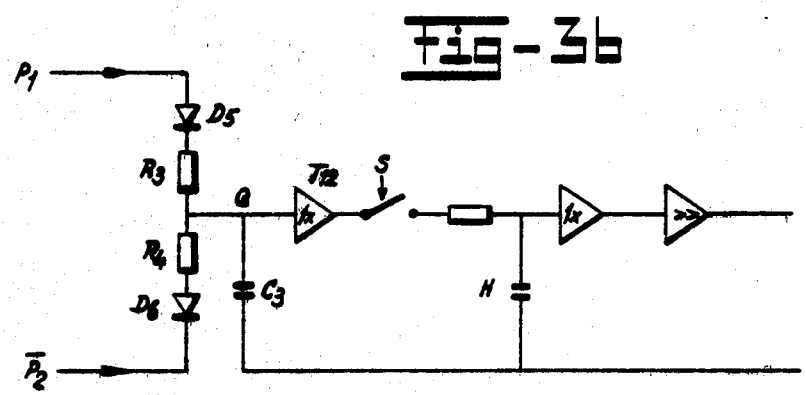
FIG. 3b shows a possible embodiment of the integration circuit.
Figure 3C:
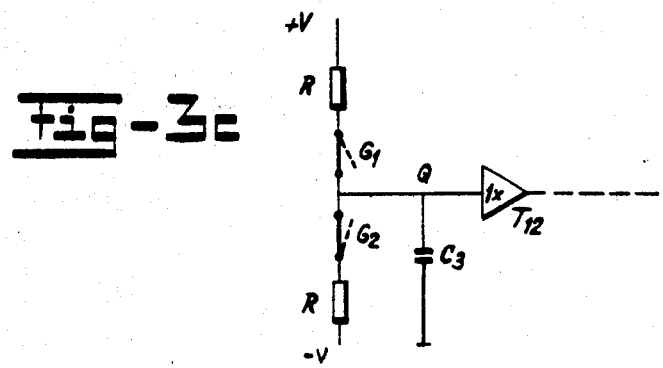
FIG. 3c shows an other possible embodiment of the integration circuit.

In FIG. 3b there is shown a first principal embodiment of the integration circuit as well as the subsequent sampling(s) and hold (H) circuit, whereas in FIG. 3c there is shown a second principal embodiment of the integration circuit.

In FIG. 3a the gate combinations T10, T10' respectively are again shown to which gate combinations the detected signals on lines B and B' are supplied. Upon application of the reset pulse (FIG. 6) to each upper Not-OR-gate of each gate combination there is generated the leading or front edge associated with the starting time of the control signals P1 and P2 (FIG. 6) received from the output of T10, T10'. The back edges of both said control signals are determined by the first and by the second detection signal, respectively. The gate combination T10, T10' is followed by the potential divider of the integration circuit, to the middle of which the integration capacitor C3 is connected.

It will now be elucidated with reference to FIG. 3b that in the rest condition there is supplied to the upper leg (R3, D5) of the potential divider a positive potential (signal P1, comparable with a voltage source) with respect to the potential (signal $\overline{P2}$) supplied to the lower leg (R4, D6) of the potential divider (for instance +vv with respect −vv=zero Volt). In the rest condition the potential at point Q on the capacitor C3 equals then the middle between P1 and $\overline{P2}$. Upon detection of a signal the potentials of P1 and $\overline{P2}$ will then subsequently change such that the potential between P1 and $\overline{P2}$ is reversed. Thereby it is possible that at first P1 and thereafter $\overline{P2}$ or the reverse will change in magnitude.

The signals P1 and $\overline{P2}$ are controlled independently, that is to say that the signal P1 is controlled by the receiving circuit connected at that time to the transducer tr1 and the signal $\overline{P2}$ is controlled by the receiving circuit connected at that time to the transducer tr2, said receiving circuits being alternated per repetition period as has been discussed already.

When the transmitted sound waves arrive at the same time that is to say when the flow velocity of the fluid is zero m/sec the signals P1 and P2 will be subject to a potential change at the same time whereby the diodes D5 and D6 are blocked. Thereby the potential on the capacitor C3 will not change.

When the transmitted signals do not arrive at the same time the detection signals emitted by both receiving circuits will not occur at the same time whereby P1 and $\overline{P2}$ will not be subject simultaneously to a potential change so that for instance D5 is blocked first, whereas the diode D6 is blocked at a time being a time interval corresponding to the difference in propagation time later after the first reception time. Within this time interval corresponding to the difference in propagation time the potential on the capacitor C3 may change in positive or in negative direction. This change is also a measure of the flow velocity of the fluid.

It is of importance that the potential at point Q is as stable as possible and that this potential will not be changed by other causes. To that effect the point Q should be terminated by a high ohmic impedance. This may for instance be attained by connecting the capacitor C3 to a buffer amplifier T12. The buffer amplifier may then be followed by a DC amplifier. The rate of change of the potential on the capacitor C3 is dependent on the elements R3, R4, C3 as well as on the potentials +vv and −vv.

In FIG. 3c there is shown another embodiment. Therein the potentials +v and −v are supplied by a voltage source. In the potential divider there have now been included no diodes but switches G1 and G2 in series which are conductive in rest condition. Like in FIG. 3b the capacitor C3 at point Q will acquire in the rest condition a potential that is adjusted to the middle of the potential difference.

Upon detection in the detection circuit and from the receiving circuits the switches G1 and G2 are opened by the control signals P1 and P2 from the gate circuit. Within the time interval, corresponding to the difference in propagation time between the opening of the switch G1 (or G2) and the opening of the switch G2 (or G1) the potential at point Q may change. This potential change is again also a measure of the flow velocity of the fluid.

Electronic switches but also other components, for instance field effect transistors, like T21 and T22 in FIG. 5a may be used as the switches G1 and G2.

From point Q the potential of the capacitor C3 is supplied through a buffer amplifier T12 to a double sampling switch T13 (FIG. 3a).

Starting from the equation $$V\cos\phi = \frac{L}{2} \cdot \frac{t_{AB} - t_{BA}}{t_{AB} \times t_{BA}}$$

this being approximately equal to Vcos $$\phi \simeq \text{constant} \cdot \frac{\Delta t}{t^2},$$

now the flow velocity V of the fluid may be measured by determining the quantity $\Delta t$ and the quantity $t^2$. Approximately $t_{AB} \cdot t_{BA}$ may be assumed to be equal to $t^2$ so that it is thus sufficient to determine one of the propagation times.

Starting from the buffer amplifier T12 it would therefore be sufficient to determine only the quantity $\Delta V$ because apart from a constant this potential change is proportional to the difference in propagation time. However, in order to compensate all balance phenomena caused by time and potential variations within the receiving circuits and within the gate and integration circuit, there are utilized the said commutators T3 and T13.

The commutator T3 (vide FIG. 2a) and the commutator T13 (vide FIG. 3a) consist of electronic switches. The commutator T3 changes the transducer connections from the one amplifier circuit to the other and in reverse, and is controlled by J.K. flipflop T19 shown in FIG. 5 that has been arranged as a divide-by-two-divider. This divide-by-two-divider divides the reset signal (vide FIG. 6) from the base clock circuit T18 so that the signals Q and $\overline{Q}$ are supplied to the control terminals of the commutator T3.

Where each of the receiving circuits is now alternately connected to the transducer tr1 and the transducer tr2 this will result in the propagation time difference convertor ($\Delta t \rightarrow \Delta V$) that the potential at point Q alternately becomes above and below the rest potential. This alternating potential is, however, relatively difficult to process.

By means of the double sampling switch T13 this alternating potential is again converted into two potentials, i.e. one positive with respect to the rest potential and one negative with respect to the rest potential at point Q. When this potential delivered by the capacitor C3 and sampled by means of the sampling switches is by turns supplied to a hold circuit T14, T15 and when these potentials are then subtracted from each other in a subsequent differential amplifier T16 there only remains two times the potential change $\Delta V$ for the rest potential is eliminated in the differential amplifier.

Figure 5:
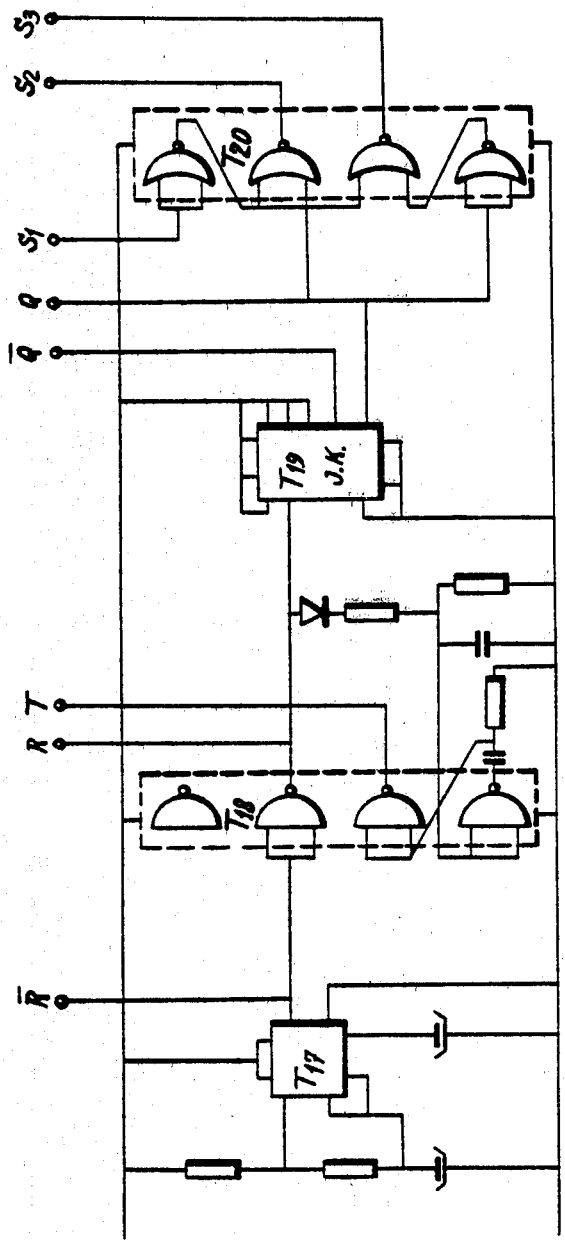
FIG. 5 shows a diagram of the clock pulse generator of the device.

The double sampling switch T13 (FIG. 3a) is controlled by the pulse signals S2 and S3 supplied by a gate circuit T20 in the clock circuit of the FIG. 5. The douple sampling switch operates thereby as follows: the switch T13a is energized by the S2 signal when the Q signal (FIG. 6) from the divide-by-two-divider T19 is zero and both the detection signals are present, i.e. both the acoustic pulses are received. The switch T13d is energized by the S3 signal when the Q signal from divide-by-two-divider T19 is +vv and both the detection signals are present. The two sampling switches a and d remain closed only for a short while so that a sampled potential is supplied to the subsequent hold circuits.

Figure 4:
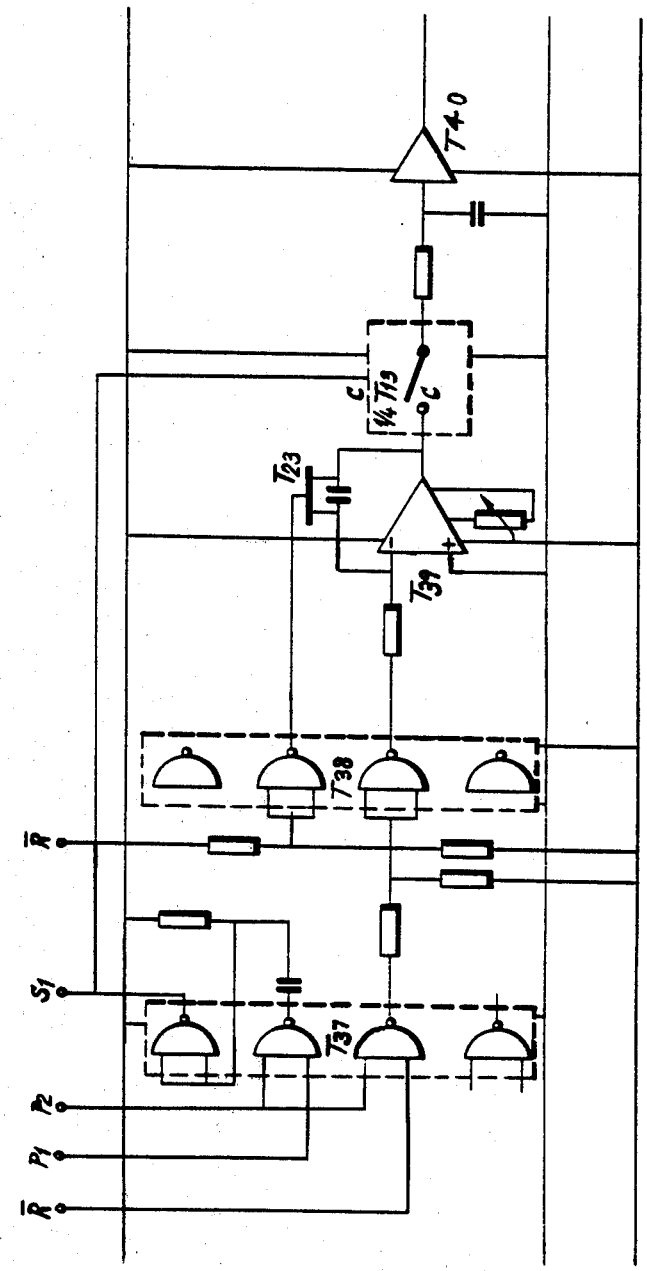
FIG. 4 represents a diagram of the propagation time integration circuit.

In FIG. 4 there is shown a propagation time integration circuit by means of which the quantity t is determined. This determination of the propagation or transit time is performed by means of a potential integration circuit.

Therefore to a gate circuit T37 having Not-AND-gates there is supplied a reset pulse provided by the clock pulse generator to one of the Not-AND-gates, whereas to the other input thereof there is supplied the P2 control signal. The P2 control signal is likewise supplied to a second Not-AND-gate, to the other input of which the P1 control signal is supplied. The output signal obtained at the output of this gate through a capacitor is supplied to a third Not-AND-switch, from the output of which the S1 pulse signal (FIG. 6) is obtained the leading edge of which coincides with the second detection signal, i.e. with the end of the time interval corresponding to the difference in propagation times.

Through a second gate circuit T38 having Not-AND-gates a potential −vv is supplied to the input of the integration circuit T39, the time interval for supplying this potential running from the transmission time to the reception time of one of the two detection signals.

Where the supplied potential is constant the output potential of the integration circuit T39 is direct proportional to the propagation time t.

In FIG. 5 there has been shown a clock circuit in which starting from a trigger circuit T17 there is obtained a reset pulse that is also supplied through one of the Not-AND-gates of the gate circuit T18 for obtaining an inverse reset pulse. From the output of this Not-AND-gate the signal is supplied through a delay circuit to both the inputs of a second Not-AND-gate in T18, from the output of which the output signal is supplied through a capacitor to both the inputs of a third Not-AND-gate in T18. From the ouput of the third Not-AND-gate the time window T is obtained for controlling the switching elements T6 provided at both the outputs of the detection circuits T5.

The reset pulse obtained from the output of the first Not-AND-gate is supplied to the input of a J.K. flipflop T19, from the outputs of which the two mutually opposite Q-signals are obtained. The flipflop T19 is yet followed by a gate circuit T20 comprising two gate combinations. The Q-signal is supplied to the inputs of a Not-OR-gate in both the gate combinations, whereas likewise the S1 signal is supplied to the second Not-OR-gate of one of said gate combinations. The signal obtained at the output of this Not-OR-gate is therein supplied to the input of the associated Not-OR-gate of this combination and to an input of a Not-OR-gate of the second gate combination to which the Q-signal is not supplied. The S2 and S3 pulse signals are then obtained from the two outputs of the Not-OR-gates to which the Q-signal is supplied.

Figure 6:
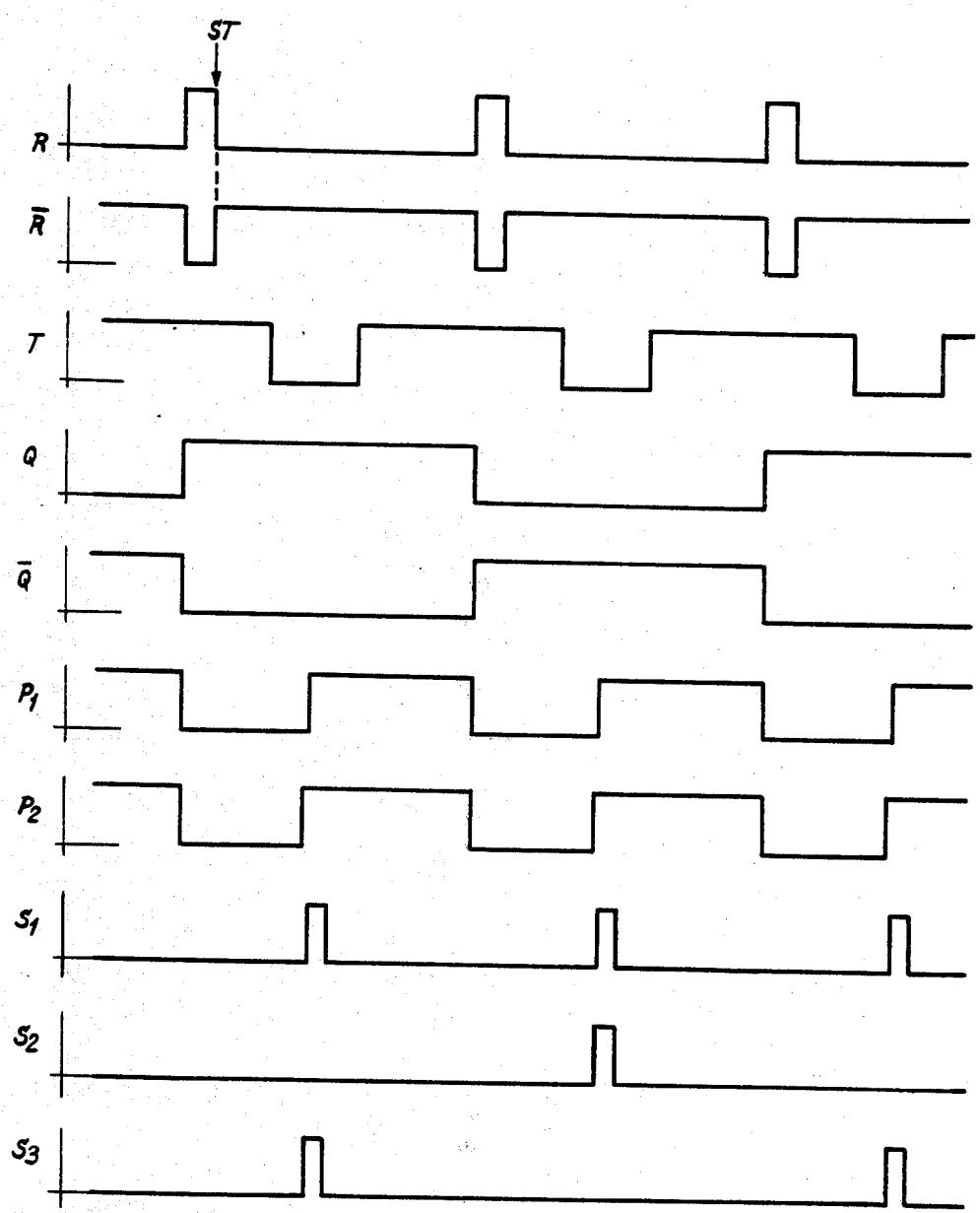
FIG. 6 shows a number of rectangular waves for elucidating the operation of the device.

With reference to the mutual time relations of the different signals reference is made to FIG. 6 in which the transmission time is marked with the reference ST.

The potentials obtained from the propagation time integration circuit (FIG. 4) and from the propagation time difference circuit (FIG. 3a) are supplied to an analogous computation unit. The mean velocity of the fluid across the measurement path is then calcualted from the two supplied potential values $V_1$ (=$\Delta V$ corresponding to $\Delta t$) and $V_2$ (corresponding to the propagation time t) while applying the equation $$V = \text{constant} \cdot \frac{(V_1)}{(V_2^2)}.$$

The constant in this equation or the value of the scale division may be adjusted by means of the combination R3, R4 and C3 in the integration circuit, the amplifier in FIG. 3a/b and the gain of the different amplifiers in FIG. 4.

When measuring the flow velocity of the fluid through a pipe or duct a further important factor is yet the relation between the mean flow velocity measured across a measurement path at a location within the pipe or duct, and the real mean flow velocity across the entire surface of the cross section of the pipe or duct. In general it will prove to be necessary to apply a correction factor K in order to convert the mean flow velocity measured across a certain measurement path into the real mean flow velocity across the entire surface of the cross section.

As is well known the correction factor i.e. the ratio between the measured and the real mean flow velocity across the surface of a section in the pipe, is dependent on the flow velocity profile of the fluid. Hence two technically different flow cases may be considered having reference to FIGS. 7a and b in which the pipe wall is indicated with the reference BW.

1. The fluid is a non-Newtonian liquid such as for instance tooth paste (a Bingham liquid). For most of the non-Newtonian liquids there may be observed a phenomenon called plug flow. The distribution of the flow velocities within the pipe then take the course of a straight line, vide FIG. 7a. Only close to the wall the velocity decreases whereas the velocity at the wall will then be zero. The mean velocity across a measurement path within the pipe is therefore almost exactly equal to the mean flow velocity across the cross section of the pipe. This means that in this case K=1.

2. The fluid is a Newtonian liquid whereby three possibilities may be distinguished:

(2a) a laminar flow in which the velocity distribution within the pipe takes a parabolic course (vide FIG. 7b). To a laminar flow, omitting some derivations, there applies the equation $K=1/(4/3-4/3b^2)$. The relative displacement of the measurement path with respect to the axis of the pipe is therein b=B.R. in which R is the radius of a circular cross section of the pipe and B is a factor smaller than 1.

(2b) a turbulent flow, vide FIG. 7a in which the velocity distribution across the pipe is substantially homogeneous. However, only close to the wall of the pipe a liquid film having a laminar flow is found. The thickness of this film is dependent on the Reynolds number. Especially it may be derived that $K=0.889+0.0091 \log Re+0.0001 (\log Re)^2$. To a measurement path ML at a distance B.R. with respect to the axis of the pipe there applies after derivation the equation (vide FIG. 7c):

$$V = V_{max}\left(1 - \frac{\sqrt{B^2R^2 + Y^2}}{R}\right)^{1/n}$$

wherein $1/n = 0.250 + 0.023 \log Re$.

By means of a computer the mean flow velocity may be determined as a function of B nd Re whereupon K may be calculated in a simple manner.

(2c) a flow without a known velocity distribution in which the flow may be within the transitional area between laminar and turbulent flow ($2000 < Re < 4000$), in which case the correction factor K varies from 0.75 to 0.93.

The flow velocity profile may also be disturbed, for instance due to an obstacle within the pipe, a bend, a valve and the like. In such a case no correction factor can be calculated. This problem may, however, be eliminated by allowing a stabilization of the flow. To that effect there is required a pipe length having a length of at least twenty times the pipe diameter. According to a further alternative solution for performing a measurement that is completely independent from the velocity profile, the flow velocity of a liquid will be measured across several measurement paths at different locations within the cross section of the pipe. The different values of V may then be integrated numerically for obtaining a total mean velocity. This requires, however, a certain number of measurement paths and many electronic circuits.

According to another alternative solution it is, however, very well possible to find a measurement path within the pipe for which the correction factor for laminar flow about equals the correction factor for turbulent flow. Thus it has already been calculated that if the measurement path is located at a distance from the axis of the pipe being between 0.497 R and 0.523 R the correction factor K will be the least dependent on the flow velocity profile. At this location the correction factor K would then equal 1.

According to the invention it has, however, become apparent experimentally that the above mentioned adjustment range of $0.497 \leq b \leq 0.523$ is not correct. This is due to the fact that the extensiveness of the electro-acoustic transducers per se was not accounted for. If, however, this extensiveness is included in the theoretical model it appears that the calculations correspond to the results of the experiments. In accordance with the above it has become apparent that the K-factor being the most independent from the flow velocity profile is obtained when the displacement of the measurement path with respect to the axis of the pipe or duct is between 0.45 R and 0.49 R. This displacement is thereby in accordance with the invention dependent on the ratio between the diameter of the pipe and the diameter of the transducer.

We claim:

1. A device for measuring the flow velocity of fluids comprising: at least one pair of electro-acoustic transducers positioned at the ends of a measurement path, each pair of said transducers simultaneously transmitting acoustic pulses and receiving the same at first and second times dependent on the velocity of the fluid, a clock pulse generator, a transmission circuit, a receiving circuit including an amplifier and a separate detection circuit for each of the transducers, an integration circuit including an integration capacitor for use in processing the difference in propagation time of the acoustic pulses wherein the transmission and reception times for each of the transducers are determined, said integration capacitor being connected to the branch point of a two-legged potential divider which is connected to a gate circuit and which has in each leg a switching means conductive in the rest condition after the transmission time, two different potentials being supplied in the rest condition to the one leg and to the other leg of said divider whereby the capacitor adjusts itself to the middle of the potential difference, while controlled by the gate circuit, the switching means associated with the one transducer of each pair being blocked after the first reception time and subsequently the switching means associated with the other transducer of each pair being blocked after the second reception time.

2. The device of claim 1 in which the clock pulse generator supplies a clock pulse associated with the transmission time, and wherein the gate circuit comprises two gate combinations to each of which there is supplied the clock pulse, and to the one gate combination, having its output connected to the one leg of the potential divider, there is supplied the detection signal supplied by the one detection circuit and to the other gate combination, having its output connected to the other leg of the potential divider, there is supplied the detection signal supplied by the other detection circuit such that each gate combination at its output supplies a switching signal corresponding to the propagation time of the pertaining acoustic pulse so that the capacitor is subject to a potential variation corresponding to the difference in propagation time.

3. The device of claim 2, wherein the potential divider is inserted at its terminals between the outputs of said two gate combinations, and the switching means are diodes.

4. The device of claim 2, wherein the potential divider is inserted at its terminals between two different DC-potentials, and the switching means, each via its control terminal, is connected to the output of the associated gate combination.

5. The device of any one of the claims 1, 2, 3 or 4, wherein in each of the receiving circuits the detection circuit comprises, in series, a level detector adjusted to a noise level and a zero point detector adjusted to a zero level, to both of which detectors the reception signal is supplied and both of which are interconnected such that the zero point detector can only supply a detection signal upon a detection signal supplied by the level detector when the noise level is surpassed.

6. The device of claim 5, wherein each of said detectors consists of a differential amplifier, the plus-inputs of which are connected to a noise level and a zero level, respectively, whereas to the minus-inputs thereof there is supplied the reception signal, whereby apart from being connected to the gate circuit the output of the zero point detector is connected to a zero potential via a switching means which is blocked only upon receipt of a detection signal from the level detector.

7. The device of claim 6, wherein between the output of the level detector and the switching means there is inserted a gate combination of two Not-OR-gates and wherein the clock pulse from the clock pulse generator is supplied to an input of the first Not-OR-gate and the detection signal from the level detector is supplied to an input of the second Not-OR-gate, and wherein the other input of the first and the second Not-OR-gate, respectively is connected to the output of the second and the first Not-OR-gate, respectively.

8. The device of claim 5, wherein the output of the level detector is also connected to a zero potential through a switching means, said switching means being controlled into conductive condition except during a time window provided by the clock pulse generator within which the reception signal is expected.

9. The device of claim 5 in which both the transducers in the transmission circuit are controlled by means of the same clock pulse, said transmission circuit comprising at least one transistor having a coil included in the load circuit across which coil a transducer is connected, each of the transducers being connected to the same said coil by means of a pair of anti-parallelly arranged diodes, said transistor having its base circuit connected to a controlling transistor through a RC-network, said controlling transistor being cut-off during the clock pulse and opened upon termination of said clock pulse so that in said transistor the current is thereby abruptly interrupted whereby a high induction voltage is produced in said coil.

10. The device of claim 1 in which the integration capacitor is connected to another part of the integration circuit through a buffer, and further comprising a commutator connected between both the outputs of the transducers and both the receiving circuits, a double sampling commutator connected to the output of the buffer, said commutators being controlled such that per repetition period each of the transducers is connected alternately to the first and the second receiving circuit, respectively, and that upon termination of the second detection signal alternately in one of the two repetition periods the output potential of the buffer is supplied by means of the first or the second sampling switch, respectively, to a hold circuit for positive voltage variations and to a hold circuit for negative voltage variations, respectively, the outputs of both said hold circuits being connected to a differential amplifier.

11. The device of claim 1 used for measuring the flow velocity of a fluid within a pipe or duct having a generally circular cross section of radius R, wherein the measurement paths employed numbering one or more are arranged at a position displaced over a distance of from 0.45 R to 0.49 R with respect to the axis of the pipe or duct.

* * * * *